(12) United States Patent
Wang et al.

(10) Patent No.: US 8,580,341 B2
(45) Date of Patent: Nov. 12, 2013

(54) METHOD OF MAKING COMPOSITE MEMBRANE

(75) Inventors: Hua Wang, Clifton Park, NY (US); Su Lu, Shanghai (CN); Hua Li, Shanghai (CN); Steven Thomas Rice, Scotia, NY (US); Joseph Anthony Suriano, Clifton Park, NY (US); Bing Zhang, Shanghai (CN); Chen Wang, Shanghai (CN); Lawrence Charles Costa, Mansfield, MA (US); Steven John Harrold, Valley Center, CA (US); David Allen Olson, Minneapolis, MN (US); Wenqing Peng, Shanghai (CN)

(73) Assignee: General Electric Company, Niskayuna, NY (US)

( * ) Notice: Subject to any disclaimer, the term of this patent is extended or adjusted under 35 U.S.C. 154(b) by 184 days.

(21) Appl. No.: 12/470,606

(22) Filed: May 22, 2009

(65) Prior Publication Data

US 2010/0297429 A1     Nov. 25, 2010

(51) Int. Cl.
    *B01D 71/56*     (2006.01)
(52) U.S. Cl.
    USPC ............. 427/244; 427/412.1; 210/500.38
(58) Field of Classification Search
    USPC .............. 427/244, 412.1; 210/500.37, 500.38
    See application file for complete search history.

(56) References Cited

U.S. PATENT DOCUMENTS

| | | | |
|---|---|---|---|
| 4,360,434 A | 11/1982 | Kawaguchi et al. | |
| 4,520,044 A * | 5/1985 | Sundet | 427/244 |
| 4,765,897 A | 8/1988 | Cadotte et al. | |
| 4,812,270 A | 3/1989 | Cadotte et al. | |
| 4,950,404 A | 8/1990 | Chau | |
| 4,983,291 A | 1/1991 | Chau et al. | |
| 5,258,203 A | 11/1993 | Arthur | |
| 5,576,057 A * | 11/1996 | Hirose et al. | 210/490 |
| 5,582,725 A * | 12/1996 | McCray et al. | 210/490 |
| 5,733,602 A * | 3/1998 | Hirose et al. | 427/245 |
| 5,989,426 A | 11/1999 | Hirose et al. | |
| 6,245,234 B1 | 6/2001 | Koo et al. | |

(Continued)

FOREIGN PATENT DOCUMENTS

EP     1958685 A1     8/2008

OTHER PUBLICATIONS

Handbook of Solubility Parameters and Other Cohesion Parameters, Second Edition p. 274 Allan F. M. Barton CRC Press, 1991.*

Petersen, "Composite Reverse Osmosis and Nanofiltration Membranes", Journal of Membrane Science, vol. 83, Review, pp. 81-150, 1993.

(Continued)

*Primary Examiner* — Michael Cleveland
*Assistant Examiner* — Alex A Rolland
(74) *Attorney, Agent, or Firm* — Mary Louise Stanford

(57) ABSTRACT

The present invention provides a composite membrane comprising a porous base membrane and a polyamide coating disposed on said porous base membrane, said polyamide coating comprising a $C_3$-$C_8$ cyclic carbonyl compound and a $C_1$-$C_8$ amide compound, said amide compound comprising at least one N—H moiety. In addition the present invention provides a method of preparing a composite membrane comprising contacting under interfacial polymerization conditions an organic solution comprising a polyacid halide with an aqueous solution comprising a polyamine, said contacting being carried out on a surface of a porous base membrane, said organic solution further comprising a $C_3$-$C_8$ cyclic carbonyl compound, said aqueous solution comprising a $C_1$-$C_8$ amide compound, said amide compound comprising at least one N—H moiety.

10 Claims, 2 Drawing Sheets

(56) References Cited

U.S. PATENT DOCUMENTS

| | | |
|---|---|---|
| 6,562,266 B2 | 5/2003 | Mickols |
| 6,723,241 B2 | 4/2004 | Mickols |
| 6,878,278 B2 | 4/2005 | Mickols |
| 2005/0284808 A1 | 12/2005 | Kurth |
| 2007/0039874 A1* | 2/2007 | Kniajanski et al. ...... 210/500.37 |

OTHER PUBLICATIONS

PCT International Search Report dated May 21, 2010 and Written Opinion.

* cited by examiner

US 8,580,341 B2

METHOD OF MAKING COMPOSITE MEMBRANE

BACKGROUND

The present invention relates to composite membranes and methods of making composite membranes. The membranes provided by the present invention display performance enhancements relative to conventional composite membranes.

A wide variety of thin film composite membranes are known and have been found useful in the purification of fluids comprising solutes, for example the removal of salt from sea water to provide potable water. Typically, such thin film composite membranes are prepared by performing an interfacial polymerization of a polyacid chloride in a water immiscible organic solvent with a polyamine in an aqueous solution on a surface of a porous base membrane. The resultant polyamide is deposited as a thin film on one surface of the porous base membrane. Such membranes are often referred to as composite membranes because of the presence of at least two layers in the membrane structure, which are the porous base membrane and the interfacially prepared polyamide film layer. Composite membrane performance characteristics have been shown to vary depending on the structure of the polyamide layer and the presence of or absence of additives in the interfacial polymerization reaction mixture. In addition, such thin film composite membranes are sensitive to the effects of water under pressure experienced as water is forced through the membrane. For example, pressure induced compaction of the polyamide film at the surface of the porous base membrane can lead to lower porosity over time and loss of membrane performance.

Despite the technical excellence of many recent advances in composite membrane technology, improvements are still being sought in light of the growing demands on the world's water supplies. There is a need for improved membranes that have a combination of high selectivity, flux and chemical tolerance in addition to being efficient and economical. Further there is a need for new membrane compositions and methods that can provide membranes having such superior performance characteristics.

BRIEF DESCRIPTION

In one embodiment, the present invention provides a composite membrane comprising a porous base membrane and a polyamide coating disposed on said porous base membrane, said polyamide coating comprising a $C_3$-$C_8$ cyclic carbonyl compound and a $C_1$-$C_8$ amide compound, said amide compound comprising at least one N—H moiety.

In another embodiment, the present invention provides a method of preparing a composite membrane comprising contacting under interfacial polymerization conditions an organic solution comprising a polyacid halide with an aqueous solution comprising a polyamine, said contacting being carried out on a surface of a porous base membrane, said organic solution further comprising a $C_3$-$C_8$ cyclic carbonyl compound, said aqueous solution comprising a $C_1$-$C_8$ amide compound, said amide compound comprising at least one N—H moiety.

In yet another embodiment, the present invention provides a method of preparing a composite membrane comprising contacting under interfacial polymerization conditions an organic solution comprising an organic triacid chloride, an aliphatic hydrocarbon solvent and cyclohexanone, with an aqueous solution comprising an aromatic diamine, water, and acetamide, said contacting being carried out on a surface of a porous polysulfone membrane, said cyclohexanone being present in an amount corresponding to from about 0.1 to about 3.5 weight percent of a total weight of the organic solution, said acetamide being present in an amount corresponding to from about 0.1 to about 3.5 weight percent of a total weight of the aqueous solution, said contacting being carried out at a temperature in a range from about 0° C. to about 80° C.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
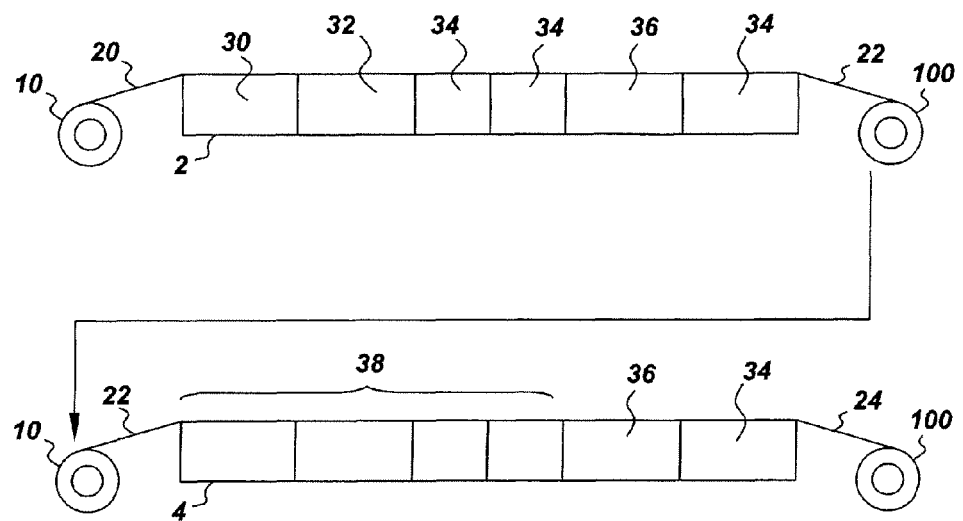
FIG. 1 illustrates a conventional apparatus for the preparation of a composite membrane.

As noted, in one embodiment, the present invention provides a composite membrane comprising a porous base membrane upon which is disposed a polyamide coating, the polyamide coating comprising a $C_3$-$C_8$ cyclic carbonyl compound and a $C_1$-$C_8$ amide compound, said amide compound comprising at least one N—H moiety. The membranes provided by the present invention are referred to as "composite membranes" since they represent a combination (or composite) of a surface layer of a polyamide on a supporting base structure, the porous base membrane. The polyamide coating component provides the chemical functionality and barrier properties needed for the selective transmission of water across the surface layer of the composite membrane while inhibiting the transmission of solutes across the surface layer of the composite membrane.

As will be appreciated by those of ordinary skill in the art, the porous base membrane is typically configured as a film having two surfaces. The polyamide coating component may be formed on one of the two surfaces of the porous base membrane affording a composite membrane having a surface coated with the polyamide and an untreated surface. Because the polyamide coating component provides for selective transmission of water across the surface layer of the composite membrane while inhibiting the transmission of solute species across the surface layer of the composite membrane, the surface of the composite membrane upon which the polyamide is disposed is frequently referred to as the "active" surface of the composite membrane. By analogy, the untreated surface of the porous base membrane retains the transmission characteristics of the original base membrane and is frequently referred to as the "passive" surface of the composite membrane.

While the polyamide component of the composite membrane is referred to as a coating, those of ordinary skill in the art will understand that the given the porous nature of the porous base membrane, the polyamide may penetrate at least a portion of the internal volume of the porous base membrane and need not be confined strictly to the surface of the porous base membrane. This is particularly true in embodiments in which the composite membrane is prepared by contacting one surface of the porous base membrane with the aqueous and organic solutions needed to effect an interfacial polymerization of a polyamine with a polyacid halide. As will be understood by those of ordinary skill in the art, the interfacial polymerization zone may include at least a portion of the internal volume of the porous base membrane.

The polyamide coating comprises a $C_3$-$C_8$ cyclic carbonyl compound and a $C_1$-$C_8$ amide compound, said amide compound comprising at least one N—H moiety. As is demonstrated in detail herein, the combination of the carbonyl compound and the amide compound provides enhanced performance of the composite membranes provided by the present invention relative to composite membranes lacking this combination of additives in the polyamide coating.

The $C_3$-$C_8$ cyclic carbonyl compound may be a cyclic ketone having from three to eight carbon atoms for example cyclooctanone, cycloheptanone, 2-methylcyclohexanone, cyclohexanone, cyclohexene-3-one, cyclopentanone, cyclobutanone, 3-ketotetrahydrofuran, 3-ketotetrahydrothiophene, and 3-ketoxetane; a cyclic ester having from three to eight carbon atoms, for example 2-methyl caprolactone, caprolactone, valerolactone, butyrolactone, diketene, and propiolactone; or a $C_3$-$C_8$ cyclic carbonate, for example ethylene carbonate, propylene carbonate, 1,2-butanediol carbonate, 1,2-pentanediol carbonate, 1,2-hexanediol carbonate, and 1,2-heptanediol carbonate.

In one embodiment, the cyclic carbonyl compound is cyclohexanone. In an alternate embodiment, the cyclic carbonyl compound is butyrolactone. In yet another embodiment, the cyclic carbonyl compound comprises a mixture of cyclohexanone and butyrolactone.

The $C_1$-$C_8$ amide compound comprising at least one N—H moiety may be aliphatic amide, a cycloaliphatic amide, or an aromatic amide. As defined herein, an amide compound comprises at least one N—H moiety directly bonded to a carbonyl group as in simple aliphatic amides such as formamide ($HCONH_2$), acetamide ($CH_3CONH_2$), propionamide ($CH_3CH_2CONH_2$); simple cycloaliphatic amides such as cyclopropane carboxamide, cyclobutane carboxamide, cyclopentane carboxamide, cyclohexane carboxamide, and cycloheptane carboxamide; simple lactams such as caprolactam and valerolactam, and simple aromatic amides such as thiophene-2-carboxamide, thiophene-3-carboxamide, benzamide, and 2-methyl benzamide.

The $C_1$-$C_8$ amide compound comprising at least one N—H moiety may bear a substituent on the N—H moiety for example a methyl group as in N-methyl acetamide, N-methyl cyclopropane carboxamide, and N-methyl benzamide. In one embodiment, the $C_1$-$C_8$ amide compound bears a substituent on the N—H moiety which is an acyl group as in N-acetyl acetamide (CAS No. 625-77-4), N-acetyl formamide, N-acetyl propionamide, N-propionyl formamide, N-propionyl propionamide, succinimide, N-acetyl cyclopropane carboxamide, and N-acetyl thiophene 2-carboxamide. Those of ordinary skill in the art will recognize that $C_1$-$C_8$ amide compounds bearing a substituent on the N—H moiety which is an acyl group may at times be referred to as referred to as imides. For example, succinimide listed above represents a cyclic amide comprising an N—H moiety to which is appended a second annular carbonyl group.

In one embodiment, the $C_1$-$C_8$ amide compound comprising at least one N—H moiety is acetamide. In another embodiment, the $C_1$-$C_8$ amide compound comprising at least one N—H moiety is formamide. In yet another embodiment, the $C_1$-$C_8$ amide compound comprising at least one N—H moiety is succinimide.

In the foregoing discussion related to the $C_3$-$C_8$ cyclic carbonyl compound and a $C_1$-$C_8$ amide compound which are components of the polyamide coating, it will be understood by those of ordinary skill in the art that mixtures of such additives may also be employed to enhance the performance of the composite membranes provided by the present invention relative to composite membranes lacking these additives in the polyamide coating.

As noted, the composite membrane provided by the present invention comprises a polyamide comprising a $C_3$-$C_8$ cyclic carbonyl compound and a $C_1$-$C_8$ amide compound disposed upon a porous base membrane. A wide variety of suitable porous base membranes are suitable and are either available commercially or may be prepared using techniques known to those of ordinary skill in the art. In one embodiment, the porous base membrane is selected from the group consisting of polysulfone, polyethersulfone, polyester, polyphenyleneoxide, polyphenylenesulfide, polyvinyl chloride, polyacrylonitrile, polyvinylidine fluoride, polytetrafluoroethylene, polycarbonate, polyimide, polyetherimide, polyetherketone, and polyetheretherketone.

In one embodiment, the composite membrane provided by the present invention comprises a porous base membrane which is a polysulfone film prepared as disclosed herein. In another embodiment, the porous base membrane is a porous polyethersulfone film.

The thickness of the porous base membrane may vary but should be sufficient to provide a composite membrane which can withstand the operation conditions present in a fluid purification device. In one embodiment, the porous base membrane has a thickness in a range from about 10 to about 500 micrometers. In another embodiment, the porous base membrane has a thickness in a range from about 20 to about 250 micrometers. In yet another embodiment, the porous base membrane has a thickness in a range from about 40 to about 100 micrometers.

In one aspect the present invention provides a method of preparing a composite membrane. In one embodiment, the method comprises contacting under interfacial polymerization conditions an organic solution comprising a polyacid halide with an aqueous solution comprising a polyamine, said contacting being carried out on a surface of a porous base membrane, said organic solution further comprising a $C_3$-$C_8$ cyclic carbonyl compound, said aqueous solution comprising a $C_1$-$C_8$ amide compound, said amide compound comprising at least one N—H moiety. The interfacial polymerization reaction is typically carried out at a temperature in a range from about 0° C. to about 80° C. In one embodiment, the interfacial polymerization reaction is carried out at a temperature in a range from about 5° C. to about 60° C. In another embodiment, the interfacial polymerization reaction is carried out at a temperature in a range from about 10° C. to about 40° C. The Experimental Part of this disclosure provides additional detailed examples of the practice of this and other aspects of the practice of the invention.

In one embodiment, the organic solution comprises an organic solvent selected from the group consisting of hydrocarbon solvents, alcohol solvents, ketone solvents, ester solvents, ether solvents, amide solvents and mixtures thereof. In one embodiment, the organic solution comprises a hydrocarbon solvent.

As noted, the organic solution comprises a $C_3$-$C_8$ cyclic carbonyl compound. In one embodiment, the organic solution comprises the $C_3$-$C_8$ cyclic carbonyl compound in an amount corresponding to from about 0.1 to about 3.5 weight percent of the total weight of the organic solution. In another embodiment, the organic solution comprises the $C_3$-$C_8$ cyclic carbonyl compound in an amount corresponding to from about 0.5 to about 2.5 weight percent of the total weight of the organic solution. In yet another embodiment, the organic solution comprises the $C_3$-$C_8$ cyclic carbonyl compound in an amount corresponding to from about 1 to about 1.5 weight percent of the total weight of the organic solution.

As noted, the aqueous solution comprises a $C_1$-$C_8$ amide compound. In one embodiment, the aqueous solution comprises the $C_1$-$C_8$ amide compound in an amount corresponding to from about 0.1 to about 3.5 weight percent of the total weight of the aqueous solution. In another embodiment, the aqueous solution comprises the $C_1$-$C_8$ amide compound in an amount corresponding to from about 0.5 to about 2.5 weight percent of the total weight of the aqueous solution. In yet another embodiment, the aqueous solution comprises the $C_1$-$C_8$ amide compound in an amount corresponding to from about 1 to about 1.5 weight percent of the total weight of the aqueous solution.

As noted, the organic solution comprises a polyacid halide which on contact with the aqueous solution comprising a polyamine reacts on the surface of the porous base membrane with the polyamine in an interfacial polymerization reaction to afford a polyamide disposed on the surface of the porous base membrane. Suitable polyacid chlorides include trimesoyl chloride, terephthaloyl chloride, isophthaloyl chloride, succinic acid diacid chloride, glutaric acid diacid chloride, adipic acid diacid chloride, trans cyclohexane-1,4-dicarboxylic acid diacid chloride, cis-cyclohexane-1,4-dicarboxylic acid diacid chloride, the triacid chloride of Kemp's triacid, and mixtures comprising two or more of these polyacid chlorides.

Suitable polyamines include para-phenylene diamine (ppd), meta-phenylene diamine (mpd), 4,4'-diaminobiphenyl, ethylene diamine, 1,3-propane diamine, 1,6-hexanediamine, 1,10-decanediamine, 4,4'-diaminodiphenyl sulfone, 1,3,5-triaminobenzene, piperazine, cis-1,3,5-cyclohexanetriamine, and mixtures comprising two or more of these polyamines.

Turning now to the figures, FIG. 1 illustrates a conventional apparatus and method for the preparation of a composite membrane. The apparatus represented in FIG. 1 comprises a feed roll 10 which delivers a membrane substrate film 20 to a membrane coating line 2 having a coating zone 30 in which an aqueous solution comprising a polyamine and an organic solution comprising a polyacid chloride are applied to one surface of the membrane substrate film 20. Zone 32 represents an interfacial polymerization zone wherein the polyamine and polyacid chloride are converted into a polyamide. Zones 34 represent drying stages of the membrane coating line. Zone 36 represents a wash zone in which the polyamide (not shown) disposed on a surface of membrane substrate film is washed with water to remove water soluble components remaining following the preceding interfacial polymerization and drying stages. Following the wash stage in Zone 36 the coated film is again dried in a drying stage 34 to provide a coated membrane substrate film 22 which is wound on receiving roll 100.

Still referring to FIG. 1. the coated membrane substrate film 22 is then subjected to chemical modification on a membrane post treatment line 4 in order to enhance the performance characteristics, for example membrane "A value", of the composite membrane. Thus coated membrane substrate film 22 is fed from feed roll 10 into the membrane post treatment line 4 which comprises a chemical treatment zone 38, a wash zone 36 and a drying zone 34 to provide a product composite membrane 24 which is stored on receiving roll 100.

Figure 2:
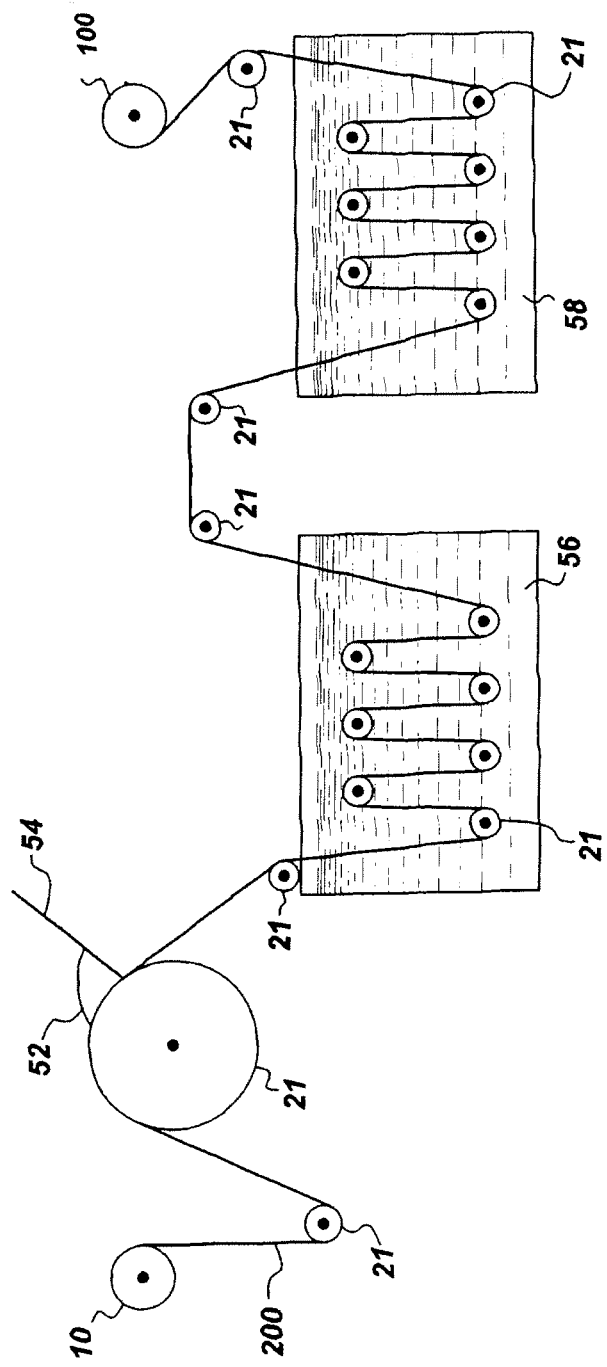
FIG. 2 illustrates an apparatus for the preparation of a porous base membrane.

Referring now to FIG. 2, the figure illustrates an apparatus and a method for the preparation of a porous base membrane supported on a membrane backing material 200. Thus, membrane backing material is fed from feed roll 10 via rollers 21 to a membrane casting solution 52 which is dispersed onto the membrane backing material 200 via metering knife 54. In one embodiment, membrane casting solution 52 is a solution of a polysulfone in a water soluble solvent such as dimethyl formamide. The membrane backing material coated with the membrane casting solution is then fed through a coagulation bath 56 containing water. The water-soluble solvent present in the membrane casting solution is dispersed into the coagulation bath and the porous base membrane precipitates onto the membrane backing material. The membrane backing material on which is deposited the porous base membrane is then passed through a rinse bath 58 to remove traces of solvent and is then stored on receiving roll 100. The membrane backing material 200 may be separated from the porous base membrane prior to use of the porous base membrane to prepare a composite membrane. Alternatively, the membrane backing material may be left in contact with the porous base membrane during the preparation of the composite membrane and removed thereafter. In instances in which the porosity and strength of the membrane backing material are suitable, the membrane backing material may be left as an integral component of both the porous base membrane and the composite membrane.

In one embodiment, the membranes provided by the present invention are prepared as follows. A substrate film (also referred to as a porous base membrane) is fed through an aqueous coating bath comprising water, a polyamine, and a $C_1$-$C_8$ amide compound comprising at least one N—H moiety. The amide compound is present in an amount corresponding to from about 0.1 to about 3.5 weight percent based on the total weight of the aqueous coating bath solution. The porous base membrane coated on one side with the aqueous solution of polyamine and amide compound is passed through a device such as a rubber nip roller or an air stream to remove excess fluid. The coated porous base membrane is then fed through an organic coating bath comprising a water-immiscible solvent, a polyacid halide, and a $C_3$-$C_8$ cyclic carbonyl compound. The $C_3$-$C_8$ cyclic carbonyl compound is present in an amount corresponding to from about 0.1 to about 3.5 weight percent of the total weight of the organic coating bath solution. Following passage through the organic coating solution, the porous base membrane is passed through a dryer to remove solvent and water provide the product composite membrane.

EXPERIMENTAL PART

General Methods

Membrane Fabrication Using Web Coating Apparatus: Membranes were fabricated by depositing a polyamide thin film layer over a porous polysulfone ultrafiltration (UF) support (the porous base membrane) using polyamide interfacial polymerization chemistry. A wet polysulfone UF support web configured on a standard web coating apparatus was drawn through a first dip-coating tank containing an aqueous solution of meta-phenylene diamine (mPD) solution (Solution A). In experiments in which embodiments of the present invention were produced, this aqueous solution comprised, in addition to the mPD, an effective amount of a $C_1$-$C_8$ amide. Excess aqueous solution on top of the support web was removed by a rubber nip roller assembly and an air-knife. Thereafter, the web was drawn through a second dip-coating tank comprising an organic solution (Solution B) of trimesoyl chloride (TMC) in Isopar G solvent. In experiments in which embodiments of the present invention were produced, this organic solution comprised, in addition to the TMC, an effective amount of a $C_3$-$C_8$ cyclic carbonyl compound. Contact on the porous base membrane (the support web) between the Solution A and Solution B resulted in interfacial polymerization of the mPD and TMC components to provide a polyamide coating disposed on the porous base membrane. The product composite membrane was then dried in a drying oven and thereafter wound upon a spool until needed.

Porous base membranes were prepared using a phase inversion method (R. E. Kesting, 1971, Synthetic Polymeric Membranes, McGraw-Hill) in which a thin film of a polysulfone solution is solidified by immersion in a bath containing water, which acts as a nonsolvent for the polymer. Thus, a casting solution comprising ULTRASAN S 6010 polysulfone (BASF) was prepared by dissolution of the polymer in a mixture comprising dimethyl formamide (DMF) and ethyleneglycol monomethylether. The casting solution comprised about 16.3 percent by weight (wt %) polysulfone polymer and 8 percent by weight ethyleneglycol monomethylether with the balance being DMF. The casting solution was metered out onto a reinforcing non-woven polyester fabric support web and the coated support was immersed in a water bath to provide a porous polysulfone film. Residual solvent was removed from the porous polysulfone film by washing the porous polysulfone film with water. The porous polysulfone films, also referred to as polysulfone ultrafiltration (UF) membranes, were kept wet until used. The porous polysulfone films prepared in this manner were useful as the porous base membrane component of the composite membranes provided by the present invention.

Membrane Performance Testing: Membrane tests were carried out on composite membranes configured as a flat sheet in a cross-flow test cell apparatus (Sterlitech Corp., Kent Wash.) (model CF042) with an effective membrane area of 35.68 cm$^2$. The test cells were plumbed two in series in each of 6 parallel test lines. Each line of cells was equipped with a valve to turn feed flow on/off and regulate concentrate flow rate, which was set to 1 gpm (gallon per minute) in all tests. The test apparatus was equipped with a temperature control system that included a temperature measurement probe, a heat exchanger configured to remove excess heat caused by pumping, and an air-cooled chiller configured to reduce the temperature of the coolant circulated through the heat exchanger.

Composite membranes were first tested with a fluorescent red dye (rhodamine WT from Cole-Parmer) to detect defects. A dye solution comprising 1% rhodamine red dye was sprayed on the polyamide surface of the composite membrane and allowed to stand for 1 minute, after which time the red dye was rinsed off. Since rhodamine red dye does not stain polyamide, but stains polysulfone strongly, a defect-free membrane should show no dye stain after thorough rinse. On the other hand, dye stain patterns (e.g. red spots or other irregular dye staining patterns) indicate defects in the composite membranes. The membranes were cut into 2 inch×6 inch rectangular coupons, and loaded into cross flow test cells. Three coupons (3 replicates) from each type of membrane were tested under the same conditions and the results obtained were averaged to obtain mean performance values and standard deviations. The membrane coupons were first cleaned by circulating water across the membrane in the test cells for 30 minutes to remove any residual chemicals and dyes. Then, synthetic brackish water containing 500 ppm magnesium sulfate was circulated across membrane at 65 psi and 25° C. The pH of the water was controlled in a range of from pH 6.5 to pH 7.5. After one hour of operation, permeate samples were collected for 10 minutes and analyzed.

After the initial test period, test coupons were exposed to 70 ppm of sodium hypochlorite at 25° C. for 30 minutes. The test coupons were then rinsed with deionized water for 1 hour. Following this "chlorination" procedure the test coupons were again tested for reverse osmosis membrane performance with the synthetic feed solution containing 500 ppm magnesium sulfate as described herein. Solution conductivities and temperatures were measured with a CON 11 conductivity meter (Oakton Instruments). Conductivites were compensated to measurement at 25° C. The pH was measured with a Russell RL060P portable pH meter (Thermo Electron Corp).

Permeate was collected in a graduated cylinder. The weight of the permeate collected was determined on a Navigator balance and time intervals were recorded with a Fisher Scientific stopwatch. Membrane permeability, expressed in terms of "A value", was calculated in each case. The A values obtained represent the permeability of water through the membrane and were measured at standard temperature (77° F. (25° C.)). A values reported herein have units of $10^{-5}$ cm$^3$/s-cm$^2$-atm.

A values were calculated from permeate weight, collection time, membrane area, and transmembrane pressure. Salt concentrations in the permeate and the feed solutions were measured by conductivity to give salt rejection values.

In certain instances, the product composite membrane was rinsed with hot deionized water and stored in a refrigerator before until testing or element fabrication. In one embodiment, the product composite membrane was treated with a solution containing polyvinyl alcohol solution and then dried before storage, testing, or element fabrication.

Comparative Example 1

A polyamide coated thin film composite RO membrane was fabricated using a laboratory membrane coater. An aqueous coating solution (Solution A, nominally 91.2 wt % water) was prepared and contained 2.0 wt % meta-phenylene diamine (mPD), 6.6 wt % triethylammonium camphorsulfonate (TEACSA), and 0.2 wt % sodium lauryl sulfate (CAS # 151-21-3) (SLS). An organic coating solution (Solution B) was prepared and contained 0.11 wt % trimesoyl chloride (TMC) in Isopar G. Using a pilot scale membrane coater, and following the General Polymerization Procedure described in the General Methods Section, a wet polysulfone porous support film was first coated with the aqueous solution containing the m-phenylenediamine (Solution A) and then coated with the organic solution comprising the trimesoyl chloride (Solution B) to effect an interfacial polymerization reaction between the diamine and the triacid chloride at one surface of the polysulfone porous support film, thereby producing a thin film composite reverse osmosis membrane. The product membrane was tested in triplicate as described in this section using a solution of magnesium sulfate (500 ppm MgSO$_4$) at an applied operating pressure of 65 pounds per square inch (psi) and operating crossflow rate of 1.0 gram per minute (grams per mole), at pH 7.0. The test results are shown in Table 1.

TABLE 1

| Entry | Membrane A Value (before chlorination) | % Salt Passage (Before chlorination) | Membrane A Value (After chlorination) | % Salt Passage (After chlorination) |
|---|---|---|---|---|
| Comparative Example 1 | 11.7 | 1.49 | 10.1 | 1.05 |

Following the test, the membrane was contacted with an aqueous solution containing 70 parts per million (ppm) of sodium hypochlorite at 25° C. for 30 minutes. The membrane was then rinsed with water for 1 hour, and then tested again with the magnesium sulfate solution under the same conditions used previously (500 ppm MgSO$_4$, operating pressure 65 (psi) and operating crossflow rate of 1.0 (gpm), pH 7.0, ambient temperature) to provide the data in Table 1 labeled "Membrane A Value (After chlorination)" and "% Salt Passage (After chlorination)".

Comparative Examples 2-4

Polyamide thin film composite RO membranes were fabricated as in Comparative Example 1 with the exception that the aqueous coating solution (Solution A) further comprised from 1.5 wt % to 3.5 wt % acetamide. The product composite membranes were tested and membrane A-values and salt passage properties were measured. Data are gathered in Table 2. The data show that when the aqueous coating solution contains dissolved acetamide performance is enhanced relative to a control (Comparative Example 1). Comparative Examples 2-4 suggest that at higher concentrations of acetamide, the porous base membrane may be sensitive to the amount of acetamide present in solution A and at 3.5 weight percent acetamide for the particular porous base membrane used in these Comparative Examples 2-4, result in a poor quality product composite membrane.

TABLE 2

Comparative Examples 2-4 Showing the Effects of a Single Additive in Solution A (acetamide) on Membrane Performance

| | | Before Treatment of Membrane with Hypochlorite | | | After Treatment of Membrane with Hypochlorite | | |
|---|---|---|---|---|---|---|---|
| Entry | Acetamide conc. (wt %) | Membrane A Value (before chlorination) | A value increase over control | % Salt Passage (Before chlorination) | Membrane A Value | A value increase over control | % Salt Passage |
| Comparative Example 1 | — | 11.7 | | 1.49 | 10.1 | | 1.05 |
| Comparative Example 2 | 1.5 | 15.5 | 3.8 | 1.25 | 15.7 | 5.6 | 1.29 |
| Comparative Example 3 | 2.5 | 16.5 | 4.8 | 0.8 | 16.4 | 6.3 | 1.09 |
| Comparative Example 4 | 3.5 | Poor quality composite membrane** | | | | | |

**A poor quality membrane was defined as a membrane having an A value <7 and % salt passage >10% (typically in the range of 10-40% salt passage). The poor RO film quality was also evident by excessive and irregular dye staining patterns when tested with rhodamine red dye as described herein.

Comparative Examples 5-7

Polyamide thin film composite RO membranes were fabricated as in Comparative Example 1 with the exception that the organic coating solution (Solution B) further comprised from 1.5 wt/vol % (2 wt/wt %), 2.5 wt/vol % (3.3 wt/wt %) or 3 wt/vol % (4 wt/wt %) cyclohexanone (chex). The product composite membranes were tested and membrane A-values and salt passage properties were measured. Data are gathered in Table 3. The data show that when the organic coating solution contains dissolved cyclohexanone performance of the product composite membrane is enhanced relative to a control (Comparative Example 1). The data show that composite membrane performance is enhanced by cyclohexanone but that the porous support membrane is damaged by as little as 4 weight percent cyclohexanone as an additive in the organic coating solution (Solution B).

Example 1

Polyamide thin film composite RO membranes were fabricated as in Comparative Example 1 with the exception that the aqueous coating solution (Solution A) further comprised 1.5 wt % acetamide and the organic coating solution (Solution B) further comprised 2.5 wt % (Example 2) cyclohexanone (chex). The product composite membranes were tested and membrane A-values and salt passage properties were measured. Data are gathered in Table 4. The data show that when both the aqueous and the organic coating solutions contain a performance enhancing additive, performance of the product composite membrane is enhanced relative to the controls (Comparative Examples 2 and 6) containing only one performance enhancing additive in either the aqueous or the organic solution. Comparative Examples 1, 2 and 6 are included in Table 4 for convenience.

TABLE 3

Comparative Examples 5-7 Showing the Effects of a Single Additive in Solution B (cyclohexanone) on Membrane Performance

| | | Before Treatment of Membrane with Hypochlorite | | | After Treatment of Membrane with Hypochlorite | | |
|---|---|---|---|---|---|---|---|
| Entry | Chex conc. (wt/wt %) | Membrane A Value (before chlorination) | A value increase over control | % Salt Passage (Before chlorination) | Membrane A Value | A value increase over control | % Salt Passage |
| Comparative Example 1 | — | 11.7 | — | 1.49 | 10.1 | — | 1.05 |
| Comparative Example 5 | 2.0 | 26.7 | 15 | 1.38 | 26.2 | 16.5 | 0.71 |
| Comparative Example 6 | 3.3 | 30.7 | 19 | 2.17 | 32 | 21.9 | 1.36 |
| Comparative Example 7 | 4.0 | Poor quality membrane** | | | | | |

**A poor quality membrane was defined as a membrane having an A value <7 and % salt passage >10% (typically in the range of 10-40% salt passage). The poor RO film quality was also evident by excessive and irregular dye staining patterns when tested with rhodamine red dye as described herein.

TABLE 4

Example 1 and Comparative Examples 1, 2 and 6 Showing the Effects
of Additives in Both Solution A (acetamide) and Solution B (cyclohexanone)
on Membrane Performance

| Entry | Chex conc. (wt/wt %) | Before Treatment of Membrane with Hypochlorite | | | After Treatment of Membrane with Hypochlorite | | |
|---|---|---|---|---|---|---|---|
| | | Membrane A Value (before chlorination) | A value increase over control | % Salt Passage (Before chlorination) | Membrane A Value | A value increase over control | % Salt Passage |
| Comparative Example 1[†] | — | 11.7 | — | 1.49 | 10.1 | — | 1.05 |
| Comparative Example 2 | —* | 15.5 | 3.8 | 1.28 | 15.7 | 5.6 | 0.71 |
| Comparative Example 6 | 3.3 | 30.7 | 19 | 2.17 | 32 | 21.9 | 1.29 |
| Example 1* | 3.3* | 49.6 | 37.9 | 2.66 | 44.37 | 34.27 | 2.95 |

[†]Comparative Example 1 contained no membrane performance enhancing additives
*Aqueous coating solution (Solution A) contained 1.5 wt/wt % acetamide as a membrane performance enhancing additive.

Comparative Example 1 (Table 4) illustrates the effect of acetamide as in coating Solution A. Thus, when coating Solution A further comprised 1.5% acetamide a 3.8 A-value enhancement was observed relative to the control (Comparative Example 1) before chlorination. Comparative Example 6 (Table 4) showed that when the organic coating solution further comprised 3.3 wt/wt % cyclohexanone a 19 point increase of A-value was observed relative to the control containing no additive in either Solution A or Solution B. In Example 1, however, an A-value enhancement of 37.9 was achieved when the aqueous coating solution further comprised 1.5% acetamide additive (relative to Comparative Example 1) and the organic coating solution further comprised 3.3 wt/wt % cyclohexanone (relative to Comparative Example 1). This effect of the two additives together is far in excess of the isolated effects of either acetamide alone or cyclohexanone alone. A clear, and surprising synergistic effect is observed when the two additives are employed together. The combined effect (+37.9) on membrane A value of the two performance enhancing components is significantly higher than the sum (+22.8=19+3.8) of the effect of each alone. This synergistic effect of the combination of a cyclic carbonyl compound in the organic coating solution and a solid amide comprising the N—H moiety in the aqueous coating solution is unexpected given the relatively minor flux enhancements observed when only one additive is employed in either the aqueous coating solution or the organic coating solution. It is also noteworthy that whereas a single membrane performance enhancing additive in either of the aqueous coating solution (Solution A) or the organic coating solution (Solution B) in excess of 3.5 weight percent will damage the porous membrane support used in this Example 1 and Comparative Examples, no damage to the membrane was observed in Example 1 despite the fact that the coated composite membrane of Example 1 comprised an amount of total membrane performance enhancing additives corresponding to more than that used in either of Comparative Examples 4 and 7.

Examples 2-8 and Comparative Examples 8-16

Membrane Fabrication Using Handframe Coating Apparatus: Composite membranes were also prepared using a handframe coating apparatus consisting of a matched pair of frames in which the porous base membrane could be fixed and subsequently coated with a polyamide coating comprising a $C_3$-$C_8$ cyclic carbonyl compound and a $C_1$-$C_8$ amide compound. The following procedure was used. The porous base membrane was first soaked in deionized water for at least 30 minutes. The wet porous base membrane was fixed between two 8 inch by 11 inch plastic frames and kept covered with water until further processed. Excess water was removed from the porous base membrane and one surface of the porous base membrane was treated with 200 grams of an aqueous solution comprising meta-phenylenediamine (2% by weight), triethylamine (2% by weight), camphorsulfonic acid (4.6% by weight) and the a $C_1$-$C_8$ amide compound, the upper portion of the frame confining the aqueous solution to the surface of the porous base membrane. After a period of 30 seconds, the aqueous solution was removed from the surface of the porous base membrane by tilting the assembly comprising the frame and the treated porous base membrane until only isolated drops of the aqueous solution could be observed on the surface of the treated porous base membrane. The treated surface was further treated by exposure to a gentle stream of air to remove isolated drops of the aqueous solution. The treated surface of the porous base membrane was then contacted with 100 grams of an organic solution comprising trimesoyl chloride (0.11% by weight) and a $C_3$-$C_8$ cyclic carbonyl compound in Isopar G solvent. Excess organic solution was then removed by tilting a corner of the frame and collecting the excess organic solution in a suitable collection vessel. The frame was then returned to a horizontal position and the remaining film of organic solution on the treated surface of the porous base membrane was allowed to stand for about 1 minute. The remaining organic solution was drained from the treated surface of the porous base membrane with the aid of a gentle air stream. The treated assembly was then placed in a drying oven and maintained at a temperature of 100° C. for a period of about 6 minutes after which the composite membrane was tested. Composite membranes provided by the present invention and composite membranes constituting Comparative Examples were prepared using the foregoing handframe procedure and performance data for these membranes is provided in Table 5 below.

TABLE 5

Performance Data for Composite Membrane Prepared on Handframe

| Entry | $C_1$-$C_8$ amide | wt %* | $C_3$-$C_8$ cyclic carbonyl compound | wt %* | A Value |
|---|---|---|---|---|---|
| Comparative Example 8 | none | — | none | — | 11.36 |

TABLE 5-continued

Performance Data for Composite Membrane Prepared on Handframe

| Entry | $C_1$-$C_8$ amide | wt %* | $C_3$-$C_8$ cyclic carbonyl compound | wt %* | A Value |
|---|---|---|---|---|---|
| Comparative Example 9 | formamide | 3 | none | — | 13.75 |
| Comparative Example 10 | acetamide | 3 | none | — | 14.40 |
| Comparative Example 11 | succinimide | 5 | none | — | 12.07 |
| Comparative Example 12 | propionamide | 5 | none | — | 16.18 |
| Comparative Example 13 | none | — | cyclohexanone | 2.5 | 17.68 |
| Comparative Example 14 | none | — | γ-butyrolactone | 3 | 19.87 |
| Comparative Example 15 | none | — | γ-butyrolactone | 1.5 | 17.28 |
| Comparative Example 16 | none | — | γ-butyrolactone | 0.5 | 19.87 |
| Example-2 | formamide | 3 | cyclohexanone | 2.5 | 21.84 |
| Example-3 | acetamide | 3 | cyclohexanone | 2.5 | 22.72 |
| Example-4 | formamide | 3 | γ-butyrolactone | 0.5 | 21.70 |
| Example-5 | acetamide | 3 | γ-butyrolactone | 0.5 | 24.09 |
| Example-6 | succinimide | 5 | cyclohexanone | 2.5 | 21.06 |
| Example-7 | propionamide | 5 | cyclohexanone | 2.5 | 22.16 |
| Example-8 | butyramide | 5 | cyclohexanone | 2.5 | 21.20 |

*Weight percentage of the amide and cyclic carbonyl compound additives in the organic and aqueous solutions respectively.

The data for Examples 2, 3, 5 and 6 in Table 5 are consistent with the synergistic effect of the amide and cyclic carbonyl compound additives observed in Example 1. Unaccountably, no synergistic effect was observed in Examples 4 and 7. The magnitude of synergistic effect of the two additives can be ascertained by comparing the effect of each additive singly on the "A value" performance of an untreated control (Comparative Example 8 (11.36)) versus the combined effect of the two additives. This set of comparisons is provided in Table 6 below which clearly shows synergistic effects in each of Examples 2, 3, 5 and 6.

TABLE 6

Synergistic Effect of Amide and Cyclic Carbonyl Compound Additives

| Entry | $C_1$-$C_8$ amide | $C_3$-$C_8$ cyclic carbonyl compound | A Value Enhancement | Synergistic Enhancement |
|---|---|---|---|---|
| Comparative Example 8 | none | none | 0.00 | — |
| Comparative Example 9 | 3% formamide | none | 2.39 | — |
| Comparative Example 10 | 3% acetamide | none | 3.04 | — |
| Comparative Example 11 | 5% succinimide | none | 0.72 | — |
| Comparative Example 12 | 5% propionamide | none | 4.82 | — |
| Comparative Example 13 | none | 2.5% cyclohexanone | 6.32 | — |
| Comparative Example 14 | none | 3% γ-butyrolactone | 8.51 | — |
| Comparative Example 15 | none | 1.5% γ-butyrolactone | 5.92 | — |
| Comparative Example 16 | none | 0.5% γ-butyrolactone | 8.51 | — |
| Example-2 | 3% formamide | 2.5% cyclohexanone | 10.48 | 1.77 |
| Example-3 | 3% acetamide | 2.5% cyclohexanone | 11.36 | 2.00 |
| Example-4 | 3% formamide | 0.5% γ-butyrolactone | 10.34 | (0.56) |
| Example-5 | 3% acetamide | 0.5% γ-butyrolactone | 12.73 | 1.18 |
| Example-6 | 5% succinimide | 2.5% cyclohexanone | 9.70 | 2.67 |
| Example-7 | 5% propionamide | 2.5% cyclohexanone | 10.80 | (0.34) |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of preparing a composite membrane comprising:
   contacting under interfacial polymerization conditions an organic solution comprising a polyacid halide with an aqueous solution comprising a polyamine, said contacting being carried out on a surface of a porous base membrane,
   wherein
   the organic solution further comprises about 0.5 wt % butyrolactone, and the aqueous solution further comprises about 3 wt % acetamide; or
   the organic solution further comprises about 2.5 wt % cyclohexanone, and the aqueous solution further comprises about 3 wt % formamide or about 3 wt % acetamide; or
   the organic solution further comprises about 2.5 wt % cyclohexanone, and the aqueous solution further comprises about 5 wt % succinamide.

2. The method according to claim 1, wherein the porous base membrane is selected from the group consisting of polysulfone, polyethersulfone, polyester, polypheynyleneoxide, polyphenylenesulfide, polyvinyl chloride, polyacrylonitrile, polyvinylidine fluoride, polytetrafluoroethylene, polycarbonate, polyetherketone, and polyetheretherketone.

3. The method according to claim 1, wherein the porous base membrane is a porous polysulfone membrane.

4. The method according to claim 1, wherein the organic solution further comprises about 2.5 wt % cyclohexanone, and the aqueous solution further comprises about 3 wt % formamide, about 3 wt % acetamide, or about 5 wt % succinamide.

5. The method according to claim 1, wherein the organic solution further comprises about 0.5 wt % butyrolactone or about 2.5 wt % cyclohexanone, and the aqueous solution further comprises about 3 wt % acetamide.

6. The method according to claim 1, wherein said polyacid halide comprises trimesoyl chloride.

7. The method according to claim 1, wherein said polyamine comprises meta-phenylene diamine.

8. The method according to claim 1, wherein the organic solution further comprises about 2.5 wt % cyclohexanone, and the aqueous solution further comprises about 3 wt % formamide.

9. The method according to claim 1, wherein the organic solution further comprises about 2.5 wt % cyclohexanone, and the aqueous solution further comprises about 5 wt % succinamide.

10. A method of preparing a composite membrane comprising:

contacting under interfacial polymerization conditions an organic solution comprising an organic triacid chloride, an aliphatic hydrocarbon solvent, and cyclohexanone, with an aqueous solution comprising an aromatic diamine, water, and acetamide, said contacting being carried out on a surface of a porous polysulfone membrane, said cyclohexanone being present in an amount corresponding to about 2.5 weight percent of a total weight of the organic solution, said acetamide being present in an amount corresponding to about 3 weight percent of a total weight of the aqueous solution, said contacting being carried out at a temperature in a range from about 0° C. to about 80° C.

* * * * *